United States Patent

[11] 3,587,380

[72] Inventor Henry E. Rowland-Jones
Johannesburg, Transvaal Province, Republic of South Africa

[21] Appl. No. 812,251
[22] Filed Apr. 1, 1969
[45] Patented June 28, 1971

[54] WORKPIECE-LOCATING DEVICES
9 Claims, 3 Drawing Figs.

[52] U.S. Cl. 83/364, 83/371
[51] Int. Cl. B26d 5/00
[50] Field of Search 83/360, 364, 371

[56] References Cited

UNITED STATES PATENTS

| | | | |
|---|---|---|---|
| 918,813 | 4/1909 | Armstrong | 83/371 |
| 2,452,402 | 10/1948 | Stringe | 83/364X |
| 2,971,417 | 2/1961 | Chlebus | 83/364 |
| 3,044,508 | 7/1962 | Sherman | 83/371X |
| 3,068,733 | 12/1962 | Held | 83/371 |
| 3,174,374 | 3/1965 | Wick et al. | 83/371X |
| 3,183,950 | 5/1965 | Sherman | 83/364X |
| 3,304,822 | 2/1967 | Barnes et al. | 83/371X |

*Primary Examiner*—William S. Lawson
*Attorney*—Shoemaker & Mattare

ABSTRACT: A locating device for workpiece in the form of boards having a surface comprising conducting and nonconducting areas thereon such as printed circuit boards, the locating device comprising a pair of conducting probes connected via a latching relay to an electrically actuated and downwardly movable clamp and means for further locating a workpiece with respect to the clamp.

INVENTOR
HENRY ERNEST ROWLAND-JONES
By Shoemaker and Mattare
ATTYS.

WORKPIECE-LOCATING DEVICES

This invention relates to means for accurately locating workpieces of a specific type, while further operations are carried out on the workpiece. Such further operations may consist of cropping, punching, printing, and in general any operation requiring accurate location of the workpiece.

The type of workpiece to which this invention is applicable is one in the form of a plate, sheet or board having conducting surfaces slightly raised in relation to an adjacent nonconducting surface. Printed circuit boards constitute an important example of such a workpiece.

In accordance with this invention the locating device comprises at least one pair of conducting probes connected via a latching relay to an electrically actuated and downwardly movable clamp.

Further features of the invention provide for an accurately located guide to be used in combination with a single pair of conducting probes or for two spaced pairs of conducting probes to be used.

Still further features of the invention will become apparent from the following description of a preferred embodiment thereof as applied to the cropping of printed circuit boards from a large board containing a multiplicity of identical printed circuits.

The marginal edges of such boards or at least two edges require to be located with extreme accuracy in relation to the printed circuits and this accurate location has hitherto presented numerous problems.

In the following description reference will be made to the accompanying drawings in which.

Figures 1, 2, 3:
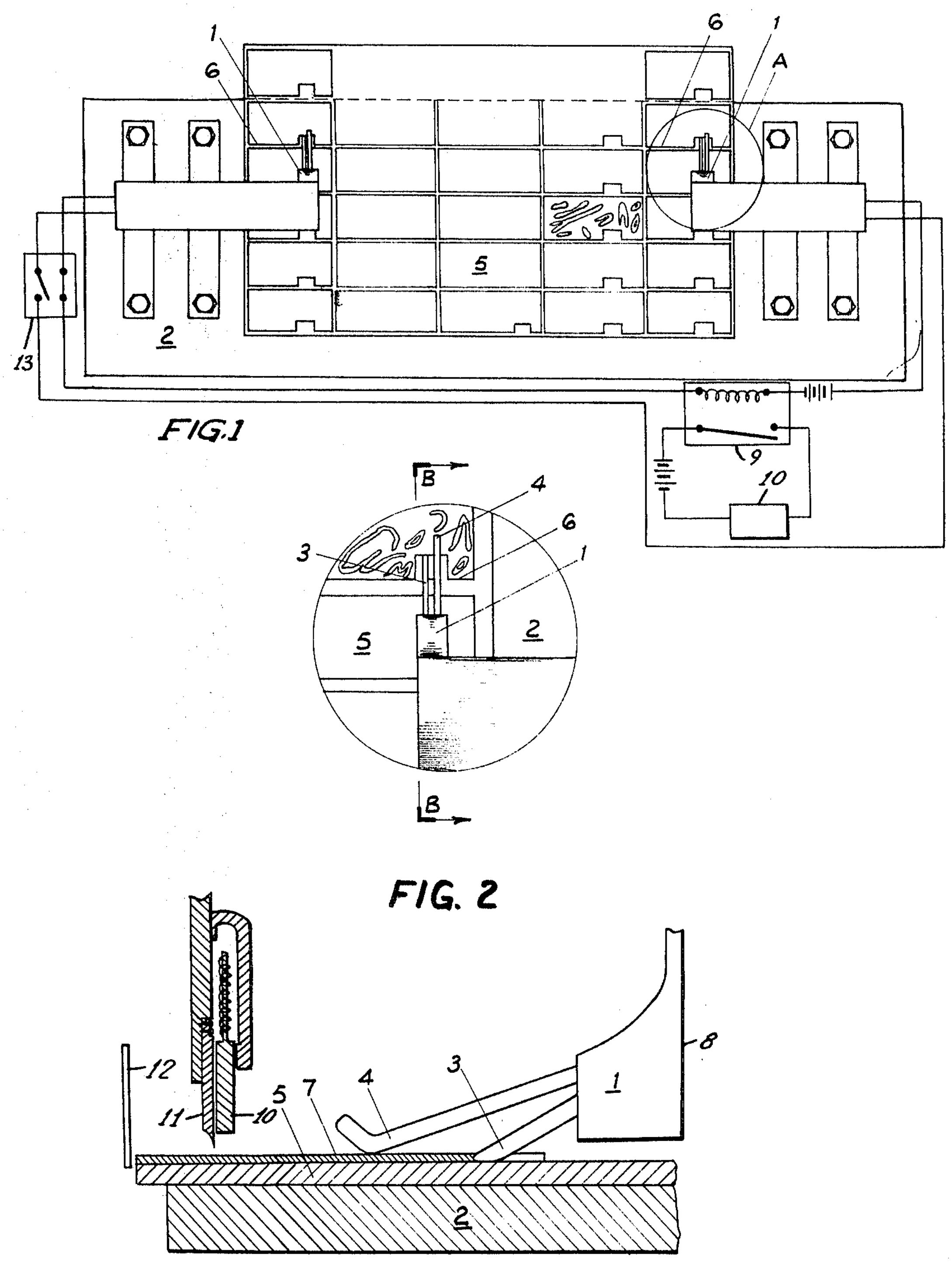
FIG. 1 is a diagrammatic plan view of the device showing a board with a plurality of printed circuits thereon and aligned for cutting by means of two pairs of probes.
FIG. 2 is an enlarged view of area A in FIG. 1.
FIG. 3 is a very much enlarged side view of the probes shown in FIG. 2.

In this preferred embodiment of the invention a pair of probe units 1 are mounted over a guillotine bed 2 and accurately located relative to a guillotine blade 11 (FIG. 3). Each unit 1 embodies two electrically conducting probes 3 and 4 the one 3 being in the form of a blade and the other 4 being upwardly curved to slide easily in contact with a circuit board 5. Each unit also embodies a suitable depressing device 8 which may be operated to press the probes onto the board or allow them to retract clear of the board.

The probes are connected in a low-voltage circuit in series with each other and with a latching relay 9. The latter actuates a clamping device 10, which when so actuated, moves down to clamp the circuit board firmly on the bed 2.

The circuit board with the individual printed circuits thereon is made basically by step and repeat photography so that the individual circuits will be accurately aligned.

The board is located by locating identical printed circuit lines 6 of two suitably spaced individual circuits relative to the probes, and accordingly relative to the guillotine blade 11. The board is thus located in approximate position, the probes lowered and the locating circuit lines on the board advanced towards the probes.

Immediately both pairs of probes contact the locating circuit lines the clamp operates to hold the board. This will occur when both of the bladelike probes 3 abut the edge of the etched conductive layer 7 with the other probes 4 contacting the upper surface of the conductive layer 7 (See FIG. 3). The guillotine blade 11 is then operated and on its return stroke releases the latching relay and accordingly the clamp.

This operation is repeated resulting in strips of individual circuits each cut along a line accurately located in relation to the circuits.

The operation is then repeated to cut each individual circuit from the line of circuits. While both pairs of probes may again be used for this it is more convenient to locate by resting the accurately cut edges obtained in the above described process against an accurately located guide 12 and using only one of the pairs of probes, the other pair being short circuited by means of a suitable switch 13.

The separated individual boards having two marginal edges at right angles, accurately cut in relation to the printed circuit may thereafter be easily located using the said marginal edges to enable the remaining marginal edges to be cut and/or holes to be punched through the board or for any other operation to be performed on the printed circuit boards.

The clamp may be operated by any suitable means operated by the relay but is preferably electromagnetically operated. The clamps are also conveniently held in position by electromagnets and the probe-depressing device is conveniently a solenoid though again other means may be used to depress the probes.

Where the guillotine blade is pneumatically or hydraulically operated it is also considered advantageous to provide a piston and cylinder assembly for locking the clamps in position absolutely rigidly whilst the guillotine blade is being operated, this being in addition to the electromagnet.

It will be appreciated that any suitable circuitry may be used for the device, and it may be convenient for the relay to actuate the guillotine blade as well, thereby providing a substantially automatic assembly.

I claim:

1. A locating device comprising at least one pair of conducting probes connected via a latching relay to an electrically actuated and downwardly movable clamp, one of the probes in said pair being chisel shaped at its operative end and arranged to accurately engage the edge of a workpiece for positioning said workpiece.

2. A locating device as claimed in claim 1 in which two pairs of probes are provided spaced apart and both being connected via the latching relay.

3. A locating device as claimed in claim 1 in which an accurately located guide is provided for use in conjunction with the pair of probes.

4. A locating device as claimed in claim 3 in which two pairs of probes are provided spaced apart and short-circuiting means is connected with one of the pairs of probes so that the probes can be short circuited.

5. A locating device as claimed in claim 1 in which the probes in a pair are of different lengths, the other of the probes being rounded at its operative end.

6. A locating device as claimed in claim 1 in which the probes are made retractable from a workpiece.

7. A locating device as claimed in claim 1 in which the device is associated with a guillotine for cutting the workpiece.

8. A locating device for printed circuit boards having a surface comprising conducting and nonconducting areas thereon, said locating device comprising at least one pair of conducting probes electrically connected via a latching relay to an electrically actuated and downwardly movable clamp means for clamping the board in a predetermined position as sensed by said probes, at least one of said probes in said pair of probes having a chisel shape at its operative end and arranged to accurately engage the edge of one of the conducting areas on said board to accurately position said board.

9. A locating device as claimed in claim 8 wherein the other probe in said pair of probes is rounded at its operative end and is arranged to engage the top surface of the conducting area on said board.